United States Patent
Fustes

(10) Patent No.: US 10,679,429 B2
(45) Date of Patent: Jun. 9, 2020

(54) TOLL PAYMENT COLLECTION WITH COMMUNICATION DEVICE

(71) Applicant: AETolls, LLC, Austin, TX (US)

(72) Inventor: Manuel Fustes, Austin, TX (US)

(73) Assignee: AETolls, LLC, Austin, TX (US)

(*) Notice: Subject to any disclaimer, the term of this patent is extended or adjusted under 35 U.S.C. 154(b) by 504 days.

(21) Appl. No.: 14/770,906

(22) PCT Filed: Feb. 21, 2014

(86) PCT No.: PCT/US2014/017586
§ 371 (c)(1),
(2) Date: Aug. 27, 2015

(87) PCT Pub. No.: WO2014/163830
PCT Pub. Date: Oct. 9, 2014

(65) Prior Publication Data
US 2016/0012648 A1 Jan. 14, 2016

Related U.S. Application Data

(60) Provisional application No. 61/776,324, filed on Mar. 11, 2013.

(51) Int. Cl.
*G07B 15/06* (2011.01)
*G06Q 20/10* (2012.01)
(Continued)

(52) U.S. Cl.
CPC ............ *G07B 15/06* (2013.01); *G06Q 20/08* (2013.01); *G06Q 20/102* (2013.01); *G06Q 20/28* (2013.01);
(Continued)

(58) Field of Classification Search
CPC ..................................................... G07B 15/06
See application file for complete search history.

(56) References Cited

U.S. PATENT DOCUMENTS 3,914,762 A * 10/1975 Klensch ................ B61L 25/045
340/5.61
6,140,941 A 10/2000 Dwyer
(Continued)

FOREIGN PATENT DOCUMENTS

| CN | 1208206 | 2/1999 |
| CN | 1501329 | 6/2004 |

(Continued)

OTHER PUBLICATIONS

Wikipedia, "Database schema," www.wikipedia.org, version of article dated Mar. 5, 2012, retrieved on Jan. 6, 2019.*

(Continued)

*Primary Examiner* — Nathan Erb
(74) *Attorney, Agent, or Firm* — Fish & Richardson P.C.

(57) ABSTRACT

Implementations include actions of receiving an image of a vehicle using a toll road facility, processing the image to determine a vehicle identifier, and determining that the vehicle identifier is provided in a database, the database associating vehicle identifiers to respective device identifiers, and in response: determining a device identifier associated with the vehicle identifier from the database, transmitting a first message to a device associated with the device identifier, the first message including a request for approval to collect a toll payment, and receiving a second message from the device, the second message indicating approval of the toll payment, and in response: transmitting a payment request to a service provider, the service provider providing data transfer services for the device, and receiving the toll payment from the service provider.

19 Claims, 4 Drawing Sheets

(51) Int. Cl.
*G06Q 20/30* (2012.01)
*G06Q 20/32* (2012.01)
*G06Q 20/08* (2012.01)
*G06Q 20/28* (2012.01)

(52) U.S. Cl.
CPC ............ *G06Q 20/30* (2013.01); *G06Q 20/32* (2013.01); *G06Q 20/3223* (2013.01); *G06Q 20/3255* (2013.01); *G07B 15/063* (2013.01)

(56) References Cited

U.S. PATENT DOCUMENTS

| | | | |
|---|---|---|---|
| 6,796,499 | B1 | 9/2004 | Wang |
| RE39,736 | E | 7/2007 | Morrill, Jr. |
| 7,742,941 | B2 | 6/2010 | Yamauchi |
| 7,970,644 | B2 | 6/2011 | Hedley |
| 2001/0014878 | A1* | 8/2001 | Mitra ............... G06Q 20/10 705/39 |
| 2003/0014181 | A1 | 1/2003 | Myr |
| 2003/0115095 | A1 | 6/2003 | Yamauchi |
| 2004/0167861 | A1 | 8/2004 | Hedley |
| 2005/0197976 | A1 | 9/2005 | Tuton et al. |
| 2005/0240410 | A1* | 10/2005 | Charles ............... H04M 3/4936 704/270 |
| 2007/0275731 | A1* | 11/2007 | Alfert ................... G07B 15/02 455/456.1 |
| 2007/0285280 | A1* | 12/2007 | Robinson ............ G07B 15/063 340/928 |
| 2008/0040210 | A1 | 2/2008 | Hedley |
| 2008/0084272 | A1 | 4/2008 | Modiano |
| 2009/0060395 | A1 | 3/2009 | Weiss et al. |
| 2009/0070257 | A1* | 3/2009 | Csoka ................... G06Q 20/10 705/39 |
| 2009/0083133 | A1* | 3/2009 | Catolico .............. G06Q 20/102 705/13 |
| 2010/0287037 | A1 | 11/2010 | Rice et al. |
| 2011/0013022 | A1* | 1/2011 | Allen ................... G07B 15/063 348/149 |
| 2011/0047009 | A1* | 2/2011 | Deitiker ................ G06Q 20/26 705/13 |
| 2011/0093315 | A1 | 4/2011 | Hafenscher |
| 2011/0137773 | A1 | 6/2011 | Davis, III et al. |
| 2011/0161140 | A1 | 6/2011 | Polt et al. |
| 2011/0194733 | A1* | 8/2011 | Wilson ............... G06K 9/00785 382/105 |
| 2011/0208568 | A1 | 8/2011 | Deitiker et al. |
| 2011/0267470 | A1 | 11/2011 | Povolny |
| 2012/0059689 | A1 | 3/2012 | Kang |
| 2012/0148105 | A1 | 6/2012 | Burry et al. |
| 2012/0173410 | A1 | 7/2012 | Gillin |
| 2012/0250938 | A1 | 10/2012 | DeHart et al. |
| 2012/0329433 | A1 | 12/2012 | Fogarty |
| 2013/0006724 | A1 | 1/2013 | Simanek et al. |
| 2013/0010116 | A1 | 1/2013 | Breed |
| 2013/0090991 | A1 | 4/2013 | Underwood |
| 2016/0203464 | A1 | 7/2016 | Fustes |

FOREIGN PATENT DOCUMENTS

| | | |
|---|---|---|
| CN | 1549211 | 11/2004 |
| CN | 1763788 | 4/2006 |
| CN | 101536043 | 9/2009 |
| CN | 103366404 A | 10/2013 |
| CN | 105637569 | 6/2016 |
| CN | 101329775 A | 12/2018 |
| EP | 1583038 | 10/2005 |
| JP | H 1079062 | 3/1998 |
| JP | 2002245135 | 8/2002 |
| JP | 2004213569 | 7/2004 |
| WO | WO 2007/118690 | 10/2007 |
| WO | WO 2011/036187 | 3/2011 |
| WO | WO 2015/030969 | 10/2015 |

OTHER PUBLICATIONS

Lin, Chin E., and Bi, Ling Yan, "A Mobile Electronic Toll Collection for E-Commerce Applications," Journal of Theoretical and Applied Electronic Commerce Research, vol. 3, Issue 2, Universidad de Talca—Chile, Aug. 2008, pp. 111-128.*
International Search Report and the Written Opinion of the International Searching Authority, for PCT/US2014/017586 dated Jun. 17, 2014, 13 pages.
Chinese Office Action in Chinese Application No. 2014800224833, dated Jul. 14, 2017, 18 pages (with English translation).
Chinese Office Action in Chinese Application No. 2014800573270, dated Mar. 1, 2017, 25 pages (with English translation).
Chinese Office Action in Chinese Application No. 2014800224833, dated Nov. 9, 2016, 18 pages (with English translation).
European Office Action in European Application No. 147780753, dated Nov. 29, 2016, 7 pages.
European Search Report in European Application No. 147780753, dated Oct. 31, 2016, 4 pages.
International Preliminary Report on Patentability, for PCT/US2014/017586 dated Sep. 24 2015, 6 pages.
International Search Report and the Written Opinion of the International Searching Authority for PCT/US2014/048373 dated Nov. 14, 2014, 9 pages.
International Preliminary Report on Patentability for PCT/US2014/048373 dated Mar. 10, 2016, 9 pages.
Mexican Office Action in Mexican Application No. MX/a/2015/011654, dated Sep. 9, 2016, 2 pages (partial English translation only).
Chinese Office Action in Chinese Application No. 2014800224833, dated Dec. 5, 2018, 24 pages.
Office Action cited in Chinese Application No. 201480022483.3 dated Jul. 2, 2019, 20 pages (English translation).
Office Action cited in Mexican Application No. MX/a/2016/002466 dated Jul. 5, 2019, 2 pages (English translation).

* cited by examiner

TOLL PAYMENT COLLECTION WITH COMMUNICATION DEVICE

CLAIM OF PRIORITY

This application is a national stage application under 35 U.S.C. § 371 of International Patent Application No. PCT/US2014/017586, filed on Feb. 21, 2014, which claims the benefit of U.S. Provisional Patent Application Ser. No. 61/776,324, filed on Mar. 11, 2013, the entire contents of which are hereby incorporated by reference in their entirety.

BACKGROUND

Facility operators collect use fees for pay-for-use facilities. In some applications, the facility operators employ electronic fee collection technologies. For example, toll road operators (TROs) use electronic toll collection technologies to collect toll fees. In some examples, TROs offer free flow (e.g., non-stop) lanes in toll roads for use by vehicles equipped with identification devices. In some examples, identification devices identify the vehicles and are associated with user balance accounts of the vehicle users. The TROs collect the toll fees from the associated user balance accounts.

In some examples, TROs capture images of vehicles using toll roads. For vehicles equipped with identification devices, the TROs collect the toll fees from the associated user balance accounts. For vehicles equipped without identification devices, TROs can use image-based transactions (IBTs) to attempt to collect toll payments. For example, IBTs can include using captured vehicle images to identify the vehicle registrants and collect toll fees from the vehicle registrants.

SUMMARY

Implementations of the present disclosure include computer-implemented methods for collecting toll fee for use of a toll road facility. In some implementations, methods include actions of receiving a first image of a first vehicle using the toll road facility, processing the first image to determine a first vehicle identifier, and determining that the first vehicle identifier is provided in a first database, the first database associating vehicle identifiers to respective device identifiers, and in response: determining a first device identifier associated with the first vehicle identifier from the first database, transmitting a first message to a first device associated with the first device identifier, the first message including a request for approval to collect a first toll payment, and receiving a second message from the first device, the second message indicating approval of the first toll payment, and in response: transmitting a first payment request to a first service provider, the first service provider providing data transfer services for the first device, and receiving the first toll payment from the first service provider. Other implementations of these aspects include corresponding systems, apparatus, and computer programs, configured to perform the actions of the methods, encoded on computer storage devices.

These and other implementations may each optionally include one or more of the following features: the first message is a text message; the text message is one of a short message service (SMS) message and a multimedia message service (MMS) message; the first service provider is a communications service provider (CSP); actions further include executing a registration protocol to register the first device identifier and the first vehicle identifier; the registration protocol includes: receiving the first vehicle identifier from the user, receiving the first device identifier from the user, and determining that the first service provider is provided in a service provider database, and in response, registering the first device identifier and the first vehicle identifier; actions further include receiving a second image of the first vehicle, the second image being processed to determine the first vehicle identifier; actions further include receiving the second image of the first vehicle in a message from the first device, the message including the first device identifier; actions further include: transmitting a third message to the first device, the third message including a request for confirming the first vehicle identifier, and receiving a fourth message from the first device, the fourth message indicating confirmation of the first vehicle identifier; actions further include: receiving a first signal, the first signal indicating that a second vehicle using the toll road facility is equipped with an identification device, the identification device associated with a balance account, and determining that the identification device is valid, and in response, collecting a second toll payment from the balance account; actions further include: receiving a second signal, the second signal indicating a second vehicle using the toll road facility is not equipped with a valid identification device, receiving a second image, the second image depicting the second vehicle, and processing the second image to determine a second vehicle identifier; actions further include: determining that the second vehicle identifier is provided in the first database, and in response: determining a second device identifier associated with the second vehicle identifier from the first database, transmitting a third message to a second device associated with the second device identifier, the third message including a request for approval to collect a second toll payment, and receiving a fourth message from the second device, the fourth message indicating disapproval of the second toll payment, and in response, receiving information associated with a registered owner of the second vehicle associated with the second vehicle identifier, and sending the owner an invoice; actions further include: receiving a fifth message from a second device of the owner, the fifth message indicating a registration request, and associating the second vehicle identifier with a second device identifier of the second device in the first database; actions further include detecting the first vehicle using the toll road facility; the first toll payment includes a plurality of unpaid toll fees; and the first device is associated with an account by the first service provider, the account being a prepaid and refillable account.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
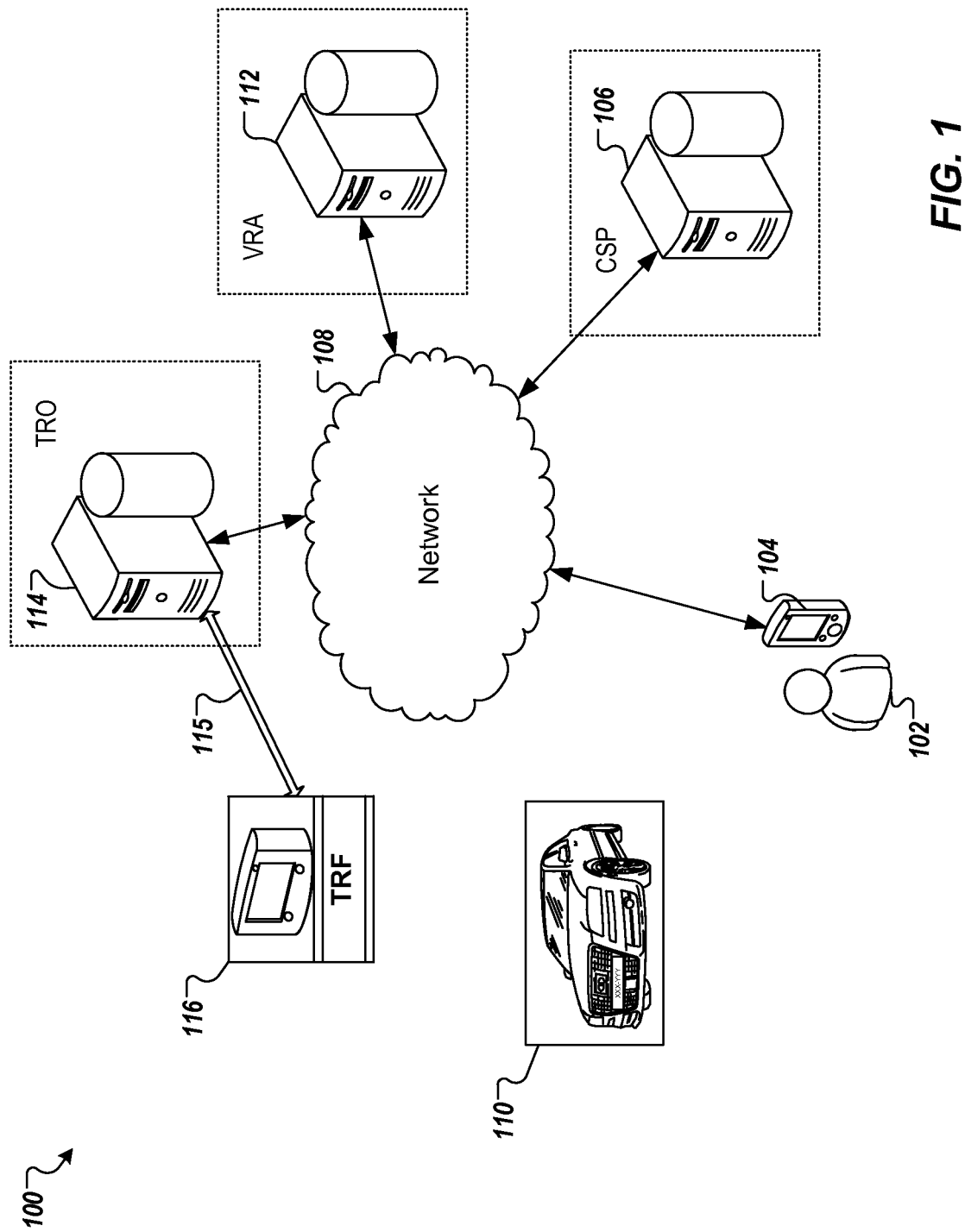
FIG. 1 depicts an example system architecture in accordance with implementations of the present disclosure.

Implementations of the present disclosure are generally directed to a payment collection system for pay-per-use facilities. More particularly, implementations of the present disclosure provide a collection schema (e.g., a toll-text schema) that enables toll road users to register with a toll road operator (TRO) and to pay toll fees based on messaging between a system associated with a TRO and a communication device associated with the toll road user. In this manner, a toll road user is able to easily and efficiently register with the TRO, and the TRO is able to easily and efficiently collect toll fees for a vehicle using the toll road facility. As discussed in further detail herein, implementations of the toll-text schema of the present disclosure enable the TRO to collect toll fees from a service provider that provides data transfer services for the communication device.

Implementations of the present disclosure include a mutual message communication schema. In some examples, a TRO system associated with a TRO receives an image of a vehicle using a toll road facility. For example, a digital image of the vehicle can be captured and a digital image file can be received by the TRO system. In some examples, the TRO system associated with the TRO is an on-premise system that is owned and operated by the TRO (e.g., on one or more servers of the TRO). In some examples, the TRO system associated with the TRO is an off-premise system that is operated on behalf of the TRO by a service provider (e.g., on one or more servers of a cloud service provider). In some examples, the TRO system processes the image to determine a vehicle identifier of the vehicle. In some examples, the vehicle identifier includes a license plate number (LPN) of the vehicle. In some examples, processing of the image can include optical character recognition (OCR) and/or vehicle signature recognition. In some examples, and the TRO system determines that the vehicle identifier is associated with a device identifier of a communication device. For example, the TRO system can access a database that associates vehicle identifiers to one or more device identifiers, each device identifier being unique to a respective communication device. In some examples, a communications device can include a mobile communications device (MCD) (e.g., a cellular telephone).

In some implementations, the TRO system transmits a message to the communication device to request approval for collecting one or more toll payments. In some examples, the TRO system receives a message from the communication device, which indicates approval to collect the toll payment(s). In some examples, in response to the message from the communication device, the TRO system transmits a payment request to a payment system. In some examples, the payment system is associated with a communications service provider (CSP) that is associated with the communication device. In some examples, the CSP can provide telephone and/or data transfer services for the communication device identifier. Example CSPs can include, but are not limited to, AT&T, Verizon, Sprint, T-Mobile, and Virgin Mobile. In some examples, the payment system associated with the CSP is an on-premise system that is owned and operated by the CSP (e.g., on one or more servers of the CSP). In some examples, the payment system associated with the CSP is an off-premise system that is operated on behalf of the CSP by a service provider (e.g., on one or more servers of a cloud service provider). The TRO collects the toll payment(s) from the CSP. The CSP collects the toll payment(s) and/or service charges from the user. Example payment methods can include monthly CSP invoicing to the user, subtraction from a user's CSP prepaid account balance, and/or an E-wallet or other payment methods (e.g., credit/debit bank accounts) managed by the CSP.

In some implementations, message communication between the TRO and the MCD is provided using one or more messaging services and/or protocols. Example messaging services and/or protocols can include multimedia service (MMS), short message service (SMS), transmission control protocol/Internet protocol (TCP/IP), and/or electronic mail (email). In some examples, an application (APP) can be installed on and executed by the MCD, where message communication between the TRO and the MCD is facilitated by the application.

FIG. 1 depicts an example system architecture 100 in accordance with implementations of the present disclosure. The example system architecture 100 includes a user 102 and a user-side device 104, server systems 106, 112, 114 and a network 108. In some examples, the device 104 can include any appropriate type of device such as a handheld computer, a tablet computing device, a personal digital assistant (PDA), a cellular telephone, a network appliance, a camera, a smart mobile phone, an enhanced general packet radio service (EGPRS) mobile phone, a media player, a navigation device, an email device, a text message device, a game console, or any appropriate combination of any two or more of these data processing devices or other data processing devices. In the example of FIG. 1, and as used by way of example throughout the remainder of the present disclosure, the user-side device 104 is provided as a MCD, such as a cellular telephone and/or a smartphone.

In some examples, the user-side device 104 and the server systems 106, 112, 114 communicate with one another over the network 108. In some examples, the network 108 can include a large computer network, such as a local area network (LAN), a wide area network (WAN), the Internet, a cellular network, or a combination thereof connecting any number of communication devices, computing devices, and/or server systems.

In some examples, each server system 106, 112, 114 can include one or more computing devices and one or more machine-readable repositories, or databases. In the depicted example, the server system 106 is associated with a CSP, the server system 112 is associated with a vehicle registration authority (VRA) (e.g., a Secretary of State and/or a Department of Transportation for a particular state), and the server system 114 is associated with a TRO. In some examples, a server system can be associated with an entity (e.g., CSP, TRO, VRA) by being owned and operated by the entity. In some examples, a server system can be associated with an entity (e.g., CSP, TRO, VRA) by being provided on behalf of the entity (e.g., by a cloud service provider). In some examples, each server system 106, 112, 114 can include one or more computing devices and one or more machine-readable repositories, or databases.

For purposes of illustration, the depicted example includes a single TRO, a single VRA, a single CSP and a single user-side device 104. It is appreciated, however, that implementations of the present disclosure can be realized with any appropriate number of TROs, VRAs (e.g., for different states), CSPs and user-side devices.

With continued reference to FIG. 1, the user 102 can be a user of a vehicle 110. In some examples, the vehicle 110 is registered with a VRA, and an underlying vehicle registration can be associated vehicle owner information (e.g., vehicle owner name and mailing address). In some examples, the VRA issues a vehicle identifier (e.g., a license plate displaying an LPN) that is unique to the vehicle 110. In some examples, and the VRA associates the vehicle identifier with the vehicle owner information (e.g., in a database provided with the server system 112).

In some examples, the CSP provides communication and/or data transfer services for the user-side device 104. In some examples, the user-side device 104 is associated with one or more unique device identifiers. An example, the device identifier can include a cellular telephone number. In some examples, the user 102 has an account established with the CSP to effect payment of telephone service charges and/or data transfer service charges. In accordance with implementations of the present disclosure, the account can be used to effect payment of toll fees, as discussed in further detail herein. In some examples, the CSP periodically (e.g., weekly or monthly) invoices the user 102 for charges incurred. In some examples, the user 102 pays for incurred charges with a user payment account. In some examples, the user payment account can be a bank account, a credit card account, a debit card account, and/or an electronic wallet (e-wallet) account. In some examples, the account is a pre-paid account, where the CSP can deduct funds to pay for incurred charges. In some examples, the pre-paid account can be an anonymous account.

With continued reference to FIG. 1, a toll road facility (TRF) 116 is provided. In some examples, the TRF 116 is associated with the TRO (e.g., the TRO owns and/or operates the TRF 116). In some examples, the TRF provides a toll road with free flow (e.g., non-stop) lanes for use by vehicles. In some examples, the TRF 116 includes one or more cameras to capture images of vehicles using the free flow lanes and can transmit image files to the server system 114 for processing, as discussed in further detail herein. In some examples, the image files can be transmitted over a facility-specific network 115 (e.g., a LAN) and/or the network 108.

In some implementations, the TRF 116 includes one or more sensing devices for detecting vehicle passage through the TRF 116 (e.g., through a free flow lane). In some examples, vehicles can be equipped with identification devices), which uniquely identify associated balance accounts for charging toll fees. Example identification devices can include radio frequency identification devices (RFIDs) (or "tags). In some examples, balance accounts are linked to user payment accounts for automated replenishment at a TRO back office system (BOS). In some examples, the one or more sensing devices can include a sensor, a detector, an RFID reader, a tag reader or a logic unit/controller deployed at the TRF. In some examples, the one or more sensing devices can include motion detectors.

As discussed in further detail herein, implementations of the present disclosure provide a protocol that includes a messaging scheme for easily and efficiently collecting fees (e.g., toll fees) for pay-to-use facilities (e.g., TRFs). In short, a user that intends to use, or that has used a TRF can register a communication device identifier and a vehicle identifier tuple (e.g., [$MCD_{ID}$, $VEH_{ID}$]) with a TRO system associated with a TRO, and the registered information can be used to collect toll fees from a CSP associated with the communication device.

Figure 2:
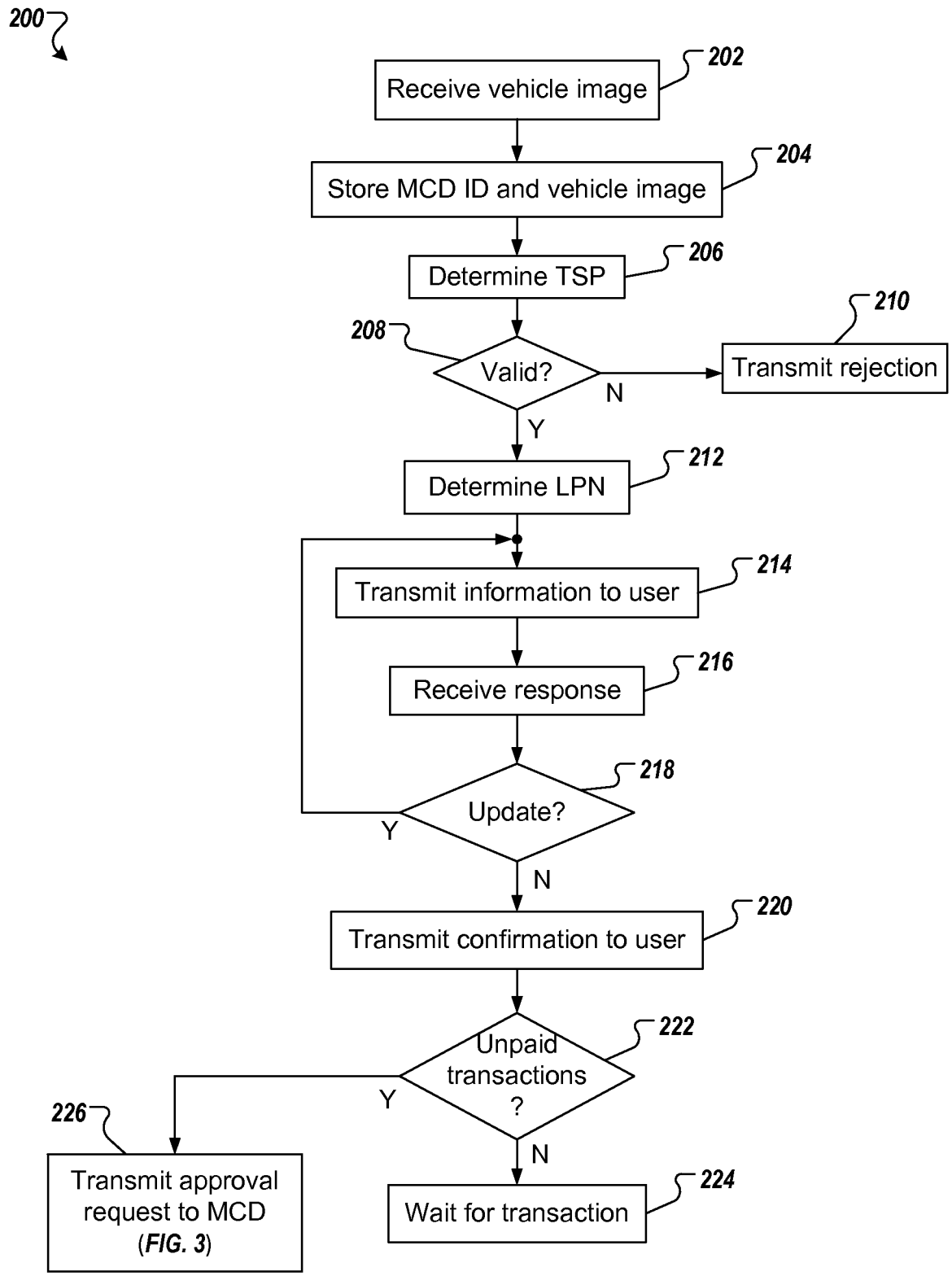
FIG. 2 depicts an example process that can be executed in accordance with implementations of the present disclosure.
Figure 3:
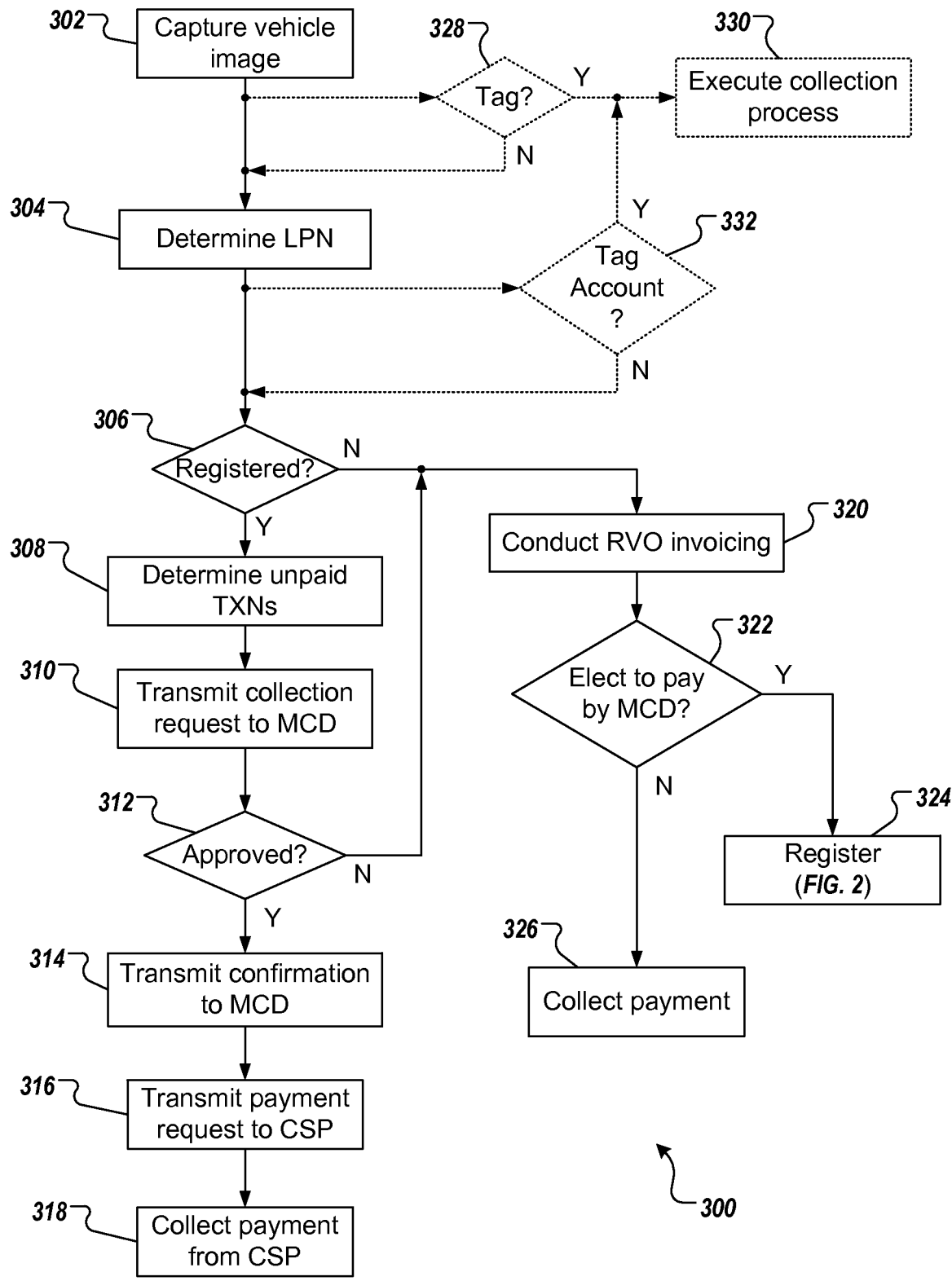
FIG. 3 depicts an example process that can be executed in accordance with implementations of the present disclosure.

Referring now to FIGS. 2 and 3, implementations of the present disclosure will be described in further detail. For purposes of illustration, labels corresponding to the example system architecture 100 of FIG. 1 are used to present corresponding devices and/or systems.

FIG. 2 depicts an example process 200 that can be executed in accordance with implementations of the present disclosure. In some examples, the example process 200 can be provided using one or more computer-executable programs executed using one or more computing devices (e.g., the server system 114 of FIG. 1).

In some implementations, of the example process 200 includes a registration protocol for a user to register a vehicle and a MCD with a TRO system. In accordance with implementations of the present disclosure, the user takes an image of the vehicle. In some examples, the user can use a camera of the MCD or another camera to take the image. In some examples, the image can include a rear-view of the vehicle and/or a front-view of the vehicle. In some examples, the image depicts the LPN of the vehicle. In some examples, the image includes vehicle fingerprint characteristics (e.g., the shape, color, and/or brand/model emblem of the vehicle). In some examples, a shape of the vehicle can be derived to provide profile information representative of the vehicle. For example, a large van will have a larger profile than a small sports car. The user transmits the image to the TRO system.

In some implementations, the user provides the vehicle LPN and region (e.g., state) of issuance, as well as the MCD identifier. In some examples, the MCD identifier can include an identifier associated with the user (e.g., a mobile subscriber integrated services digital network-number (MSISDN) and/or a subscriber identity module (SIM)). In some examples, the identifier associated with the user is a telephone number. In some examples, the MCD identifier can include a unique serial number (e.g., mobile equipment identity (MEI/IMEI)).

In some implementations, the user uses the MCD to transmit the image to the TRO system using a messaging service and/or communication protocol. In this manner, the image and the MCD identifier can be provided to the TRO system. For example, a telephone number can be associated with a registration process (e.g., 888-729-8655 (PAY-TOLL)) and the user can transmit the image using the telephone number. In some implementations, the user uses a computing device (e.g., a desktop computer) to transmit the image and a MCD identifier (e.g., MCD ID) to the TRO system (e.g., by email, through a web portal provided by the TRO system). In any case, the TRO system receives the image and/or data that can be processed to identify the vehicle and the MCD identifier (e.g., associated with the user by the CSP system).

A vehicle image is received (202). In some examples, the TRO system receives the vehicle image from a user and is associated with a MCD. In some examples, the MCD ID is determined, and the MCD ID and vehicle image are stored (204). In some examples, the TRO system stores the MCD ID and the vehicle image in a registration database.

A CSP that provides communication and/or data transfer services for the MCD is determined (206). In some examples, a registry of CSPs can be cross-referenced based on the MCD ID to identify the CSP that provides communication and/or data transfer services for the MCD. It can be determined whether the CSP is a valid CSP (208). In some examples, a CSP can be determined to be a valid CSP, if the CSP is included in the registry of CSPs. In some examples, a CSP is a valid CSP, if the CSP supports message-based payment protocols (e.g., toll-text schema). If it is determined that the CSP is not a valid CSP, the TRO system transmits a rejection message (210). In some examples, the rejection is transmitted using the same channel (e.g., SMS message, MMS message, email or application-based message) used to provide the vehicle image and the MCD ID to the TRO system.

If the CSP is a valid CSP), the LPN of the vehicle is determined (212). In some examples, the TRO system processes the image to determine the LPN (212). In some examples, the TRO system processes the image using image analysis processes. An example image analysis process can include OCR. In some examples, the TRO system also processes the image to provide vehicle fingerprint characteristics from the vehicle. In some examples, the TRO system can determine a region (e.g., state, province) of registration. For example, a state where the vehicle is registered and that issued the LPN can be determined. In some examples, the region can be provided in the LPN itself. In some examples, the region can be identified on the license plate and can be determined based on image processing of the vehicle image.

Information is transmitted to the user (214). In some examples, the TRO system transmits a message (e.g., SMS message, MMS message, email or application-based message) to the MCD based on the MCD identifier. In some examples, the message includes the LPN and the state of issuance. In some examples, the message can include a request for the user to verify the information. In some examples, the message indicates that, if the information of the LPN and the region of registration are correct, the user is to transmit back a positive acceptance code in a response message. An example message can include:

TX 123 456
If OK & you accept terms, message: 12
If incorrect, message 13+state & LPN In this example, the message indicates that the registration region was determined to be the state of Texas (TX) and the LPN was determined to be 123 456. Further, the example message asks the user to confirm accuracy of the information and their participation in the payment scheme by sending a response message including the number 12 (e.g., acceptance code). The example message also asks the user to send a response message including the number 13 (e.g., rejection code), the registration state and the LPN, if the provided information is incorrect.

A response message is received (216). In some examples, the TRO system receives the response message. It is determined whether to update the information of the LPN and/or the registration region (218). For example, if the response message includes corrected information and/or a rejection code (e.g., "13"), the TRO system determines that the information is to be updated. In some examples, the information can be updated based on information provided in the response message and/or based on re-processing the vehicle image. If the response message includes an acceptance code (e.g., "12"), the TRO system determines not to update the information, and a confirmation message is transmitted to the user (220). In some examples, the TRO system transmits the confirmation message (e.g., SMS message, MMS message, email or application-based message) to the MCD based on the MCD identifier.

In some examples, the confirmation message includes information notifying the user that the registration is complete and/or that the user will be contacted to approve charges for using the subject TRF. In some examples, the confirmation message can explain the user's obligation to approve or refuse payment of toll fees. In some examples, the confirmation message can inform the user that the registration will be cancelled and/or that alternative collection methods will be adopted if the user refuses to approve payment of or fails to respond to a payment request. In some implementations, alternative collection methods can include a standard pay-by-mail collection method (e.g., sending an invoice by mail to the registered vehicle owner, as determined from the VRA). In some examples, the pay-by-mail collection method incurs higher payment charged to the user due to higher collection costs and/or administrative costs.

In some examples, the confirmation message can instruct the user to visit a website for details of a payment agreement between the TRO and the user. In some examples, the registration process can include requiring the user to visit a website and confirm that the user has read and agreed to terms of service. In some examples, user confirmation can be provided by the user entering the MCD ID and the LPN to the website. In some examples, the user is required to visit such a website within a threshold time (e.g., 2 days) of having received the confirmation message. In some examples, the confirmed payment agreement and/or the terms of service ("confirmation information") enable the TRO to request payment from the CSP associated with the MCD. In some examples, the TRO can provide confirmation information to the CSP. In some examples, the confirmation information includes the user's permission for the CSP to function as a payment agent and to charge the user's CSP account. In some examples, as discussed in further detail herein, the inclusion of financial transactions into the CSP billing process can occur after the TRO has notified the user of any unpaid detected and recorded transactions related to use of the TRF and the user has approved the charges for inclusion into the TSP billing process.

In some examples, and in response to receiving the response message, the TRO system associates the vehicle identifier (e.g., LPN) with the device identifier (e.g., MCD ID) in the registration database (e.g., LPN-MCD database). Once the registration is completed, the TRO can scan unpaid transactions charged to the vehicle identifier and notify the user to pay.

In some implementations, a device identifier can be associated with a plurality of vehicle identifiers in the registration database. In this manner, a user can register multiple vehicles for the collection scheme. For example, when a user registers, the CSP system can determine that another MCD identifier is already associated with the particular LPN. In such cases, the CSP system can confirm with the user whether the user would like to register a second MCD identifier with the same LPN.

In some examples, a vehicle identifier is associated with one device identifier (e.g., to avoid notification and billing ambiguity or potential multiple billing for a single toll fee). In some examples, a vehicle identifier is associated with multiple device identifiers. For example, a toll fee approval request, discussed in further detail below, can be provided to multiple MCDs, and an approval from one of the MCDs can result in collection for the toll fee being made to the CSP associated with the responding MCD.

In some implementations, the TRO and/or the user can de-register the vehicle identifier with the device identifier. For example, the user can de-register when the user sells the vehicle, has a different LPN associated with the vehicle, when the user changes the MCD ID, and/or when the user enrolls in another payment scheme (e.g., a tag account system).

With continued reference to FIG. 2, it can be determined whether any unpaid transactions have already been incurred for the vehicle (222). For example, and as discussed in further detail below with reference to FIG. 3, the user can use the TRF before having registered for the payment scheme. Consequently, the TRO system can already include a record for use of the TRF by the vehicle associated with the LPN that the user just registered. If it is determined that there are unpaid transactions, a payment approval request can be transmitted to the user (226) (discussed in further detail below with reference to FIG. 3). If it is determined that there are no unpaid transactions, the TRO system waits for a transaction to occur (e.g., the vehicle to pass through the TRF).

FIG. 3 depicts an example process 300 that can be executed in accordance with implementations of the present disclosure. In some implementations, the example process 300 can be provided by one or more computer-executable programs executed using one or more computing devices (e.g., the server system 114 of FIG. 1).

A vehicle image is captured (302). For example, when a vehicle uses a TRF, the TRF detects the vehicle passing and captures an image. In some examples, the TRF captures the image as part of a toll transaction. In some examples, a toll transaction includes the vehicle image, a toll point location identifier, direction of travel, time/date, vehicle class, and/or transponder identifier (e.g., if the vehicle also includes a transponder). In some examples, the TRF provides the image to the TRO system. An LPN is determined (304). In some examples, the TRO system receives the image, and processes the image to determine the LPN. It is determined whether the vehicle is registered for the collection schema of the present disclosure (306). For example, the TRO system references a registration database (e.g., LPN-MCD database) that associates vehicle identifiers to respective device identifiers (e.g., MCD ID). If it is determined that the vehicle is not registered (e.g., the vehicle identifier is not provided in the database), the example process continues at 320.

If it is determined that the vehicle is registered (e.g., the vehicle identifier is provided in the database), unpaid transactions associated with the LPN are collected (308). In some examples, an unpaid transaction can include a current transaction (e.g., that triggered the example process 300). In some examples, an unpaid transaction can include a previous transaction (e.g., previous use of the TRF, for which payment has not yet been requested and/or approved).

A collection request message is transmitted to the MCD that is associated with the determined LPN (310). In some examples, the TRO system transmits the collection request message as an electronic message (e.g., SMS message, MMS message, or application-based message) to the device (310). In some examples, the collection request message includes a request for approval to collect payment for one or more toll fees from the CSP. In some examples, the collection request is provided for a single toll fee (e.g., for a single use of the TRF). In some examples, the collection request is provided for a plurality of tolls fees associated with the LPN.

In some implementations, the TRO system provides collection requests for each transaction. In some examples, the TRO system provides batch collection requests. For example, the TRO system can accumulate a plurality of unpaid transactions or toll fees charged to the device identifier within a period of time. In some examples, the period of time can be a logical billing cycle (e.g., daily, weekly, monthly). In this manner, the number of collection messages sent to users can be reduced.

In some examples, the TRO system bundles the plurality of unpaid transactions into groups (e.g., entry and exit transactions, short and long trip transactions, round trip transactions). In some examples, the TRO system can provide a plurality of toll products to TRF users (e.g., long trip discounts, trip caps, round trip discounts). In some examples, the TRO system can process the plurality of toll products to the corresponding groups of unpaid transactions to calculate a total toll payment for the plurality of unpaid transactions.

An example collection request message can include:
Toll Passages: Mar. 22, 2013
10:02 am NB SH130@IH-10: $1.80
15:47 pm SB SH130@IH-10: $1.80
Total: $3.60
To approve text 91, to reject text 96

In some examples, sending a collection request message can be optional. For example, the user can provide preapproval for collection requests. In this manner, the TRO system can automatically proceed to collecting toll fees from a CSP system (as discussed herein) without sending a collection request message to and/or receiving an approval message from the user.

It is determined whether the collection request has been approved (312). If the collection request has not been approved, the example process 300 continues at 320. In some examples, the user can text a rejection code (e.g., 96). In some examples, if a response is not received within a pre-determined period of time, rejection of the collection request is assumed. In some examples, the approval message can indicate a specified period of time for the user to respond. In some examples, if the TRO system has not received a response within the specified period of time, rejection is assumed.

If the collection request has been approved, a confirmation message is transmitted to the MCD (314). For example, the TRO system can receive an approval message from the MCD with an approval code (e.g., 91), indicating that the user approves the toll payment(s). In response, the TRO system transmits confirmation message (e.g., SMS message, MMS message or application-based message) to the device. In some examples, the confirmation message includes a payment receipt of the toll payment(s). In some examples, the payment receipt can include additional information (e.g., advertisement information, discount information). In some examples, when a collection request message is not needed (e.g., the user has pre-approved toll charges), the payment receipt is anyway sent.

A payment request is transmitted to the CSP system (316). In some examples, the TRO system provides a payment request to the CSP system. In some examples, the payment request includes data confirming the user's approval to the collection request (e.g., the approval response from the MCD), and/or details of the transaction(s). Payment is collected from the CSP (318). For example, the TRO system receives payment from the CSP (e.g., the CSP transfers funds to the TRO). In some examples, the TRO uses an agent to collect the first toll payment from the CSP. In some examples, batch payments can be made from the CSP to the TRO. For example, a payment from the CSP to the TRO can include payment for transactions incurred by multiple users that the CSP is a service provider for.

In some examples, the CSP can charge a fee to the user for functioning as a payment agent for collection of pay-per-use fees. In some examples, the user can pay charges from the CSP using a user payment account (e.g., at the end of a billing cycle). In some examples, the CSP provides payment to the TRO after the user has paid the CSP.

With continued reference to FIG. 3, registered vehicle owner (RVO) processing is conducted (320). For example, if the LPN is not registered (306) or the user does not approve the collection request (312), RVO processing is conducted in an effort to collect payment of the transaction fee(s). In some examples, the TRO system can request or access vehicle registration information (e.g., provided by one or more VRAs). In some examples, RVO information can be retrieve based on the vehicle identifier and can include a registered owner of the vehicle associated with the vehicle identifier.

In some examples, the TRO prints and sends an invoice indicating a charge to the RVO based on the RVO information (e.g., mailing address). In some examples, the invoice can include information informing the RVO of the collection schema to pay the toll charge(s) through a device (e.g., MCD) by registering with the TRO. In some examples, the information can include a registration protocol and can instruct the RVO to transmit an image of the vehicle to the TRO to start the registration protocol with the TRO. In some examples, the invoice can include information notifying the RVO that payment of the charge(s) can be made with another user payment account (e.g., a bank account, a credit card account, a debit card account, or an E-wallet account), if the RVO does not want to pay using the collection schema.

In some examples, is determined whether the RVO elects to pay by MCD (322). In some examples, if the TRO has not received a response to the paper invoice within a specified period of time, it can be determined that the RVO has not elected to pay by MCD. As another example, if payment has been collected by another payment channel (e.g., a bank account, a credit card account, a debit card account, or an E-wallet account), it can be determined that the RVO has not elected to pay by MCD. If it is determined that the RVO has not elected to pay by MCD, and the user has not paid the invoice, other collection channels can be pursued (326). If it is determined that the RVO does elect to pay by MCD, registration can be performed (e.g., as discussed above with reference to FIG. 2). In some example, it can be determined that the RVO elects to pay by MCD, by receiving a vehicle image (e.g., 202 of FIG. 2).

In some implementations, the example process 300 depicted in FIG. 3 includes additional operations. In some examples, it can be determined whether a tag is detected for a vehicle passing through the TRF (328). In some examples, the TRF can includes a sensing device to detect whether there is an identification device equipped with the vehicle using the TRF (e.g., RFID tag), which identifies the vehicle and has been associated with a balance account. The balance account is linked to user payment accounts for automated replenishment at a TRO BOS. Consequently, a collection process can be executed based on the balance account (330). For example, the TRO system receives a signal from the TRF to determine whether there is a valid identification device (e.g., tag) equipped with the vehicle. In some examples, the TRO system determines that there is a valid identification device equipped with the vehicle, the TRO system processes the transaction as an identification device transaction, and collects a toll fees from the balance account associated with the identification device.

In some examples, if it is determined that a tag is not detected for a vehicle passing through the TRF, the LPN can be determined (304), as discussed above. In some examples, it is determined whether the LPN is associated with an identification device (e.g., a tag account) (332). In some examples, the TRO system can cross-reference the LPN with a tag database (e.g., LPN-Tag database). If it is determined that the LPN is not associated with a tag account, the example process 300 proceeds as discussed above. If it is determined that the LPN is associated with a tag account, collection process can be executed based on the balance account (330).

Figure 4:
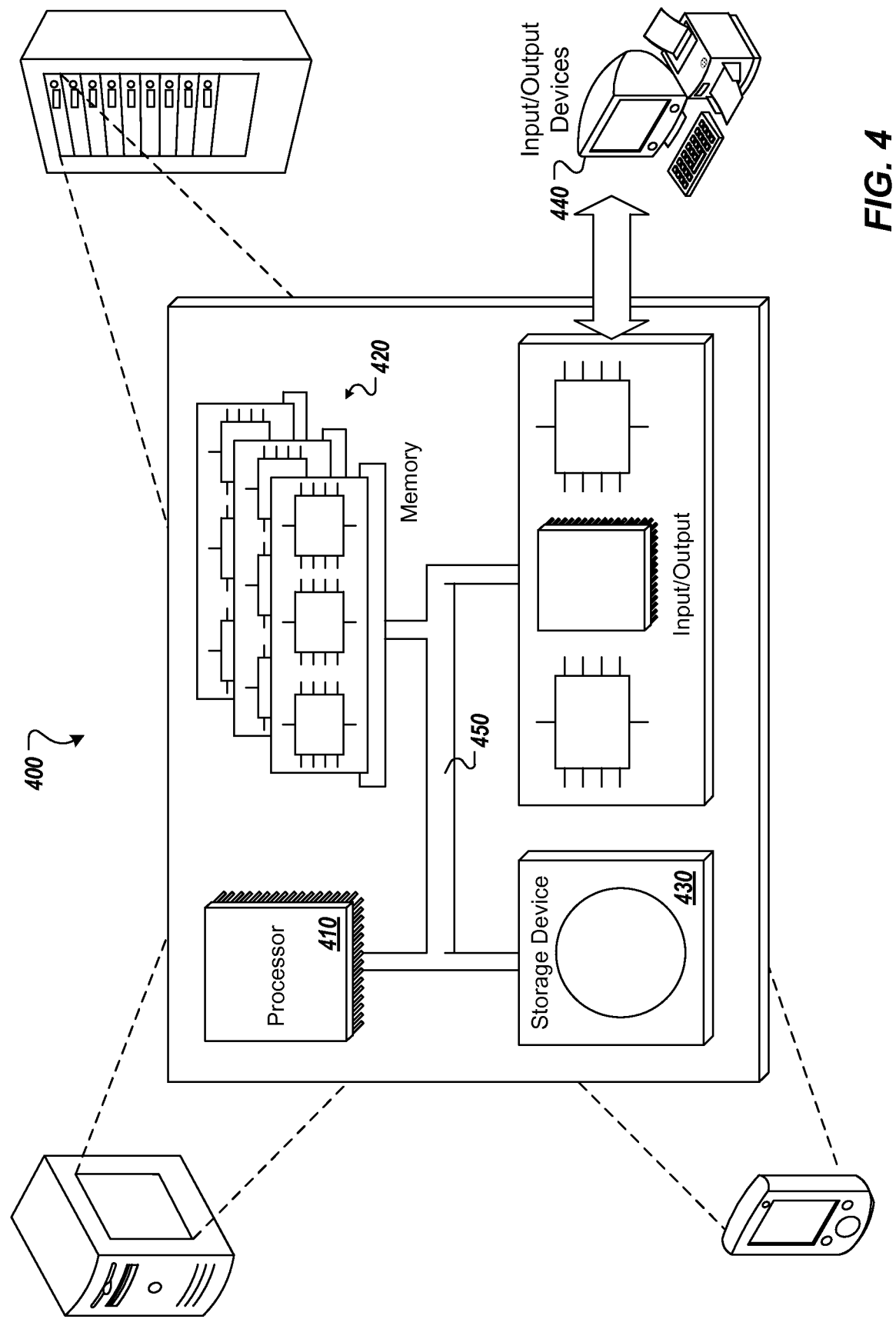
FIG. 4 depicts a schematic diagram of an example computing system that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors for collecting toll fee for use of a toll road facility, the method comprising:
   receiving, through one or more messages over a messaging service provided by a communications service provider (CSP), a first vehicle identifier associated with a vehicle, and a first device identifier of a first computing device;
   registering the first vehicle identifier and the first device identifier for a toll-text schema in a first database;
   receiving a first signal, the first signal indicating a first vehicle using the toll road facility is not equipped with a valid electronically readable toll-tag;
   receiving a first image of the first vehicle from a camera of the toll road facility;
   processing, by the one or more processors, the first image to determine the first vehicle identifier;
   determining, based on cross-referencing the first vehicle identifier with a toll-tag database, that the first vehicle identifier is not associated with a toll-tag account, the toll-tag database listing vehicle identifiers that are associated with electronically readable toll-tags; and
   in response to determining both that the first vehicle is not equipped with the valid electronically readable toll-tag and that the first vehicle identifier is not associated with the toll-tag account, determining that the first vehicle identifier is registered for the toll-text schema by determining that the first vehicle identifier is provided in the first database, the first database associating vehicle identifiers to respective device identifiers registered for the toll-text schema, and in response:
      determining the first device identifier associated with the first vehicle identifier from the first database,
      identifying whether there are any prior toll transactions, for which payment has not yet been approved, associated with the first vehicle identifier,
      transmitting a first message to the first computing device associated with the first device identifier, the first message comprising a request for approval to collect a first toll payment, the first toll payment including any identified prior toll transactions, and
      receiving a second message from the first computing device over the messaging service provided by the CSP, the second message indicating approval of the first toll payment, and in response:
         transmitting a first payment request to a first service provider, the first service provider providing data transfer services for the first computing device, and
         receiving the first toll payment from the first service provider.

2. The method of claim 1, wherein the first message is a text message.

3. The method of claim 2, wherein the text message is one of a short message service (SMS) message and a multimedia message service (MMS) message.

4. The method of claim 1, wherein the first service provider is the CSP.

5. The computer-implemented method of claim 1, further comprising executing a registration protocol to register the first device identifier and the first vehicle identifier.

6. The method of claim 1, further comprising receiving a second image of the first vehicle, the second image being processed to determine the first vehicle identifier.

7. The method of claim 1, further comprising receiving a message from the first computing device comprising a second image of the first vehicle and the first device identifier.

8. The method of claim 1, further comprising:
transmitting a third message to the first computing device, the third message comprising a request for confirming the first vehicle identifier; and
receiving a fourth message from the first computing device, the fourth message indicating confirmation of the first vehicle identifier.

9. The method of claim 1, further comprising:
receiving a second signal, the second signal indicating that a second vehicle using the toll road facility is equipped with a toll-tag device, the toll-tag device associated with a balance account; and
determining that the toll-tag device is valid, and in response:
collecting a second toll payment from the balance account.

10. The method of claim 1, further comprising:
receiving a second signal, the second signal indicating a second vehicle using the toll road facility is not equipped with a valid toll-tag device;
receiving a second image, the second image depicting the second vehicle; and
processing the second image to determine a second vehicle identifier.

11. The method of claim 10, further comprising:
determining that the second vehicle identifier is provided in the first database, and in response:
determining a second device identifier associated with the second vehicle identifier from the first database,
transmitting a third message to a second computing device associated with the second device identifier, the third message comprising a request for approval to collect a second toll payment, and
receiving a fourth message from the second computing device, the fourth message indicating disapproval of the second toll payment, and in response:
receiving information associated with a registered owner of the second vehicle associated with the second vehicle identifier, and
sending the owner an invoice.

12. The method of claim 11, further comprising:
receiving a fifth message from the second computing device, the fifth message indicating a registration request; and
associating the second vehicle identifier with the second device identifier of the second computing device in the first database.

13. The method of claim 1, further comprising detecting the first vehicle using the toll road facility.

14. The method of claim 1, wherein the first toll payment includes a plurality of unpaid toll fees.

15. The method of claim 1, wherein the first computing device is associated with an account by the first service provider that is a prepaid and refillable account.

16. A vehicle toll processing system comprising:
one or more processors; and
one or more tangible, non-transitory media operably connectable to the one or more processors and storing instructions that, when executed, perform operations comprising:

receiving, through one or more messages over a messaging service provided by a communications service provider (CSP), a first vehicle identifier associated with a vehicle, and a first device identifier of a first computing device;
registering the first vehicle identifier and the first device identifier for a toll-text schema in a first database;
receiving a first signal, the first signal indicating a first vehicle using a toll road facility is not equipped with a valid electronically readable toll-tag;
receiving a first image of the first vehicle from a camera of the toll road facility;
processing, by the one or more processors, the first image to determine the first vehicle identifier;
determining, based on cross-referencing the first vehicle identifier with a toll-tag database, that the first vehicle identifier is not associated with a toll-tag account, the toll-tag database listing vehicle identifiers that are associated with electronically readable toll-tags; and
in response to determining both that the first vehicle is not equipped with the valid electronically readable toll-tag and that the first vehicle identifier is not associated with the toll-tag account, determining that the first vehicle identifier is registered for the toll-text schema by determining that the first vehicle identifier is provided in the first database, the first database associating vehicle identifiers to respective device identifiers registered for the toll-text schema, and in response:
determining the first device identifier associated with the first vehicle identifier from the first database,
identifying whether there are any prior toll transactions, for which payment has not yet been approved, associated with the first vehicle identifier,
transmitting a first message to the first computing device associated with the first device identifier, the first message comprising a request for approval to collect a first toll payment, the first toll payment including any identified prior toll transactions, and
receiving a second message from the first computing device over the messaging service provided by the CSP, the second message indicating approval of the first toll payment, and in response:
transmitting a first payment request to a first service provider, the first service provider providing data transfer services for the first computing device, and
receiving the first toll payment from the first service provider.

17. The system of claim 16, wherein the first message is a text message.

18. The system of claim 17, wherein the text message is one of a short message service (SMS) message and a multimedia message service (MMS) message.

19. A non-transitory computer readable storage medium storing instructions that, when executed by at least one processor, cause the at least one processor to perform operations comprising:
receiving, through one or more messages over a messaging service provided by a communications service provider (CSP), a first vehicle identifier associated with a vehicle, and a first device identifier of a first computing device;
registering the first vehicle identifier and the first device identifier for a toll-text schema in a first database;
receiving a first signal, the first signal indicating a first vehicle using a toll road facility is not equipped with a valid electronically readable toll-tag;

receiving a first image of the first vehicle from a camera of the toll road facility;

processing, by the at least one processor, the first image to determine the first vehicle identifier;

determining, based on cross-referencing the first vehicle identifier with a toll-tag database, that the first vehicle identifier is not associated with a toll-tag account, the toll-tag database listing vehicle identifiers that are associated with electronically readable toll-tags; and in response to determining both that the first vehicle is not equipped with the valid electronically readable toll-tag and that the first vehicle identifier is not associated with the toll-tag account, determining that the first vehicle identifier is registered for the toll-text schema by determining that the first vehicle identifier is provided in the first database, the first database associating vehicle identifiers to respective device identifiers registered for the toll-text schema, and in response:

determining the first device identifier associated with the first vehicle identifier from the first database, identifying whether there are any prior toll transactions, for which payment has not yet been approved, associated with the first vehicle identifier, transmitting a first message to the first computing device associated with the first device identifier, the first message comprising a request for approval to collect a first toll payment, the first toll payment including any identified prior toll transactions, and receiving a second message from the first computing device over the messaging service provided by the CSP, the second message indicating approval of the first toll payment, and in response:

transmitting a first payment request to a first service provider, the first service provider providing data transfer services for the first computing device, and receiving the first toll payment from the first service provider.

\* \* \* \* \*